(12) United States Patent
Baring-Gould et al.

(10) Patent No.: US 7,346,758 B1
(45) Date of Patent: Mar. 18, 2008

(54) SYSTEM AND METHOD FOR TRACE MESSAGING

(75) Inventors: Sengan Baring-Gould, Ward, CO (US); David Jarosh, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 287 days.

(21) Appl. No.: 11/125,456

(22) Filed: May 10, 2005

(51) Int. Cl.
*G06F 12/00* (2006.01)

(52) U.S. Cl. .......................................... 711/207; 714/45
(58) Field of Classification Search .................. 711/207
See application file for complete search history.

(56) References Cited

U.S. PATENT DOCUMENTS

| | | | | |
|---|---|---|---|---|
| 5,944,841 | A * | 8/1999 | Christie | 714/38 |
| 6,185,732 | B1 * | 2/2001 | Mann et al. | 717/128 |
| 6,430,675 | B1 * | 8/2002 | Hsu et al. | 712/205 |
| 2003/0005271 | A1 * | 1/2003 | Hsu et al. | 712/237 |
| 2004/0015675 | A1 * | 1/2004 | Kyker et al. | 711/207 |
| 2005/0060516 | A1 * | 3/2005 | Bottemiller et al. | 712/34 |
| 2006/0095674 | A1 * | 5/2006 | Twomey | 711/125 |
| 2006/0271919 | A1 * | 11/2006 | Moyer | 717/136 |

* cited by examiner

*Primary Examiner*—Matthew Kim
*Assistant Examiner*—Ryan Dare

(57) ABSTRACT

Disclosed herein are exemplary techniques for generating trace information streams to facilitate the reconstruction of the instruction execution history of a processing device for a given time period. The linear instruction pointers or other representations of the instructions executed by a processing device are output as a trace information stream. When one or more translation lookaside buffers (TLBs) used by the processing device are modified by the addition of a new linear-to-physical translation and/or the eviction of an old linear-to-physical translation, a representation of the newly added translation entry, or, alternatively the evicted translation entry, is inserted into the trace information stream. In this manner, the context for the address mapping of the instruction pointers of the trace information stream is provided and, consequently, the execution instruction history of the processing device may be more fully reconstructed.

19 Claims, 3 Drawing Sheets

SYSTEM AND METHOD FOR TRACE MESSAGING

FIELD OF THE DISCLOSURE

The present disclosure is related generally to instruction traces and more particularly to providing instruction trace information in processing devices utilizing paging.

BACKGROUND

To aid debug procedures, many processors incorporate a mode in which trace information is recorded so that an executed instruction history may be reconstructed for a particular time segment. The trace information typically represents a history of the value of the instruction pointer as it changes over the time segment and usually is provided as a stream of instruction pointer values. A debug module or diagnostic software then may use this stream of instruction pointer values to identify the corresponding instruction code and thereby determine whether the processor is operating correctly.

In many such processing systems, virtual memory with paging is utilized whereby the instruction pointer is a linear address that may map to a plurality of different physical addresses, where the proper physical address associated with the linear address depends on context. In such instances, the proper association of the recorded stream of instruction pointers to the corresponding instruction code depends on the context of each instruction, where the context defines the mapping of linear addresses to the corresponding physical addresses and typically includes an indication of the processor mode, the values of one or more control registers and the state of the page tables for each instruction executed. However, due to current processor speeds, the context information for each executed instruction typically is too large to be recorded in the trace information or monitored by the processor or an instruction-by-instruction basis. Conventional debug implementations typically assume that the mapping at the termination of the trace applies to the whole trace and thereby disassembles the trace based only on the last context. Consequently, the instructions subsequent to the last context change typically are correctly identified, but those instructions prior to the last context change typically are incorrectly identified, thereby limiting the usefulness of the trace as a debug tool. Accordingly, an improved technique for providing trace information in processors utilizing paging would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

FIGS. 1-6 illustrate exemplary techniques for generating trace information streams to facilitate the reconstruction of the instruction execution history of a processing device for a given time period. In at least one embodiment, the instruction pointers or other representations of the instructions executed by a processing device are output as a trace information stream. When a translation lookaside buffer (TLB) used by the processing device is modified by the addition of a new linear-to-physical translation and/or the eviction of an old linear-to-physical translation, a representation of the newly added translation entry, or, alternatively the evicted translation entry, is inserted into the trace information stream. In this manner, the proper context for the address mapping of the instruction pointers of the trace information stream is provided and, consequently, the execution instruction history of the processing device may be more fully reconstructed.

Figure 1:
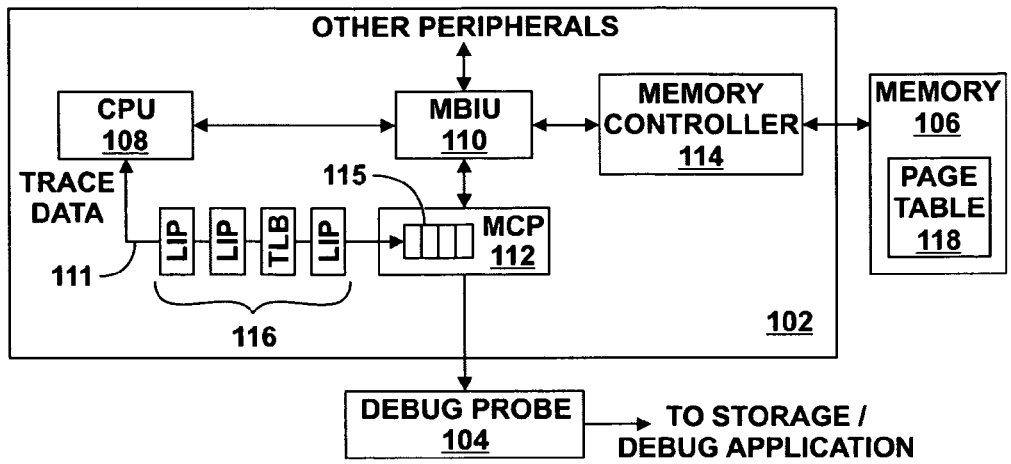
FIG. 1 is a block diagram illustrating an exemplary processing system utilizing trace messaging in accordance with at least one embodiment of the present disclosure.

Referring now to FIG. 1, an exemplary processing system 100 is illustrated in accordance with at least one embodiment of the present disclosure. The processing system 100 includes a processing device 102 (e.g., a processor or microcontroller) connected to one or more peripheral devices, such as, for example, a debug probe 104 and a system memory 106. The processing device 102 includes a central processing unit (CPU) 108, a master bus interface unit (MBIU) 110, a machine control processor (MCP) 112 and a memory controller 114. In operation, the CPU 108 obtains instruction data from an internal cache and/or the system memory 106 (via the memory controller 114 and the MBIU 110), executes the instructions represented by the instruction data, and provides the results for output to one or more peripheral devices via the MBIU 110.

In at least one embodiment, the CPU 108 operates in a paging mode whereby the instructions executed by the CPU 108 are identified using a linear address, whereas the instruction data representing the instructions are stored based on a physical address. Accordingly, the CPU 108 may utilize a page table 118 stored in, for example, system memory 118 to assist in the conversion of the linear addresses to their corresponding physical addresses. To facilitate faster operation, the CPU 108 may implement one or more local translation lookaside buffers (discussed below with reference to FIG. 2) to cache the most recently used linear-to-physical translations accessed from the page table 118.

When in a trace mode operation, the CPU 108, in one embodiment, provides a representation of the linear addresses of instructions (referred to herein as the linear instruction pointers or LIPs) during or after their execution by the CPU 108. The LIPs (or representations thereof)

output by the CPU 108 are provided as a trace information stream 116 to the MCP 112 via a diagnostic bus 111. The MCP 112, in turn, buffers the trace information stream 116 in, for example, a trace cache 115 prior to providing the trace information stream 116 to the debug probe 104. The debug probe 104, in turn, may be connected to a storage device (e.g., memory) for access by a debug module (not shown) for analysis of the operation of the CPU 108.

Further, as discussed in greater detail below, the CPU 108 monitors the status of its one or more TLBs. In the event of a change in a TLB, the CPU 108 inserts a representation of the change into the trace information stream 116. In one embodiment, the CPU 108 identifies when a new translation entry is added to a TLB and, in response, provides a representation of the newly added translation entry to the MCP 112 as part of the trace information stream 116. Alternately, the CPU 108 identifies when a translation entry is evicted from a TLB and, in response, provides a representation of the evicted translation entry to the MCP 112 as part of the trace information stream 116. In other embodiments, the CPU 108 may identify both addition events and eviction events with regard to the one or more TLBs and, in response, provide representations of both newly added translation entries and evicted translation entries.

Figure 2:
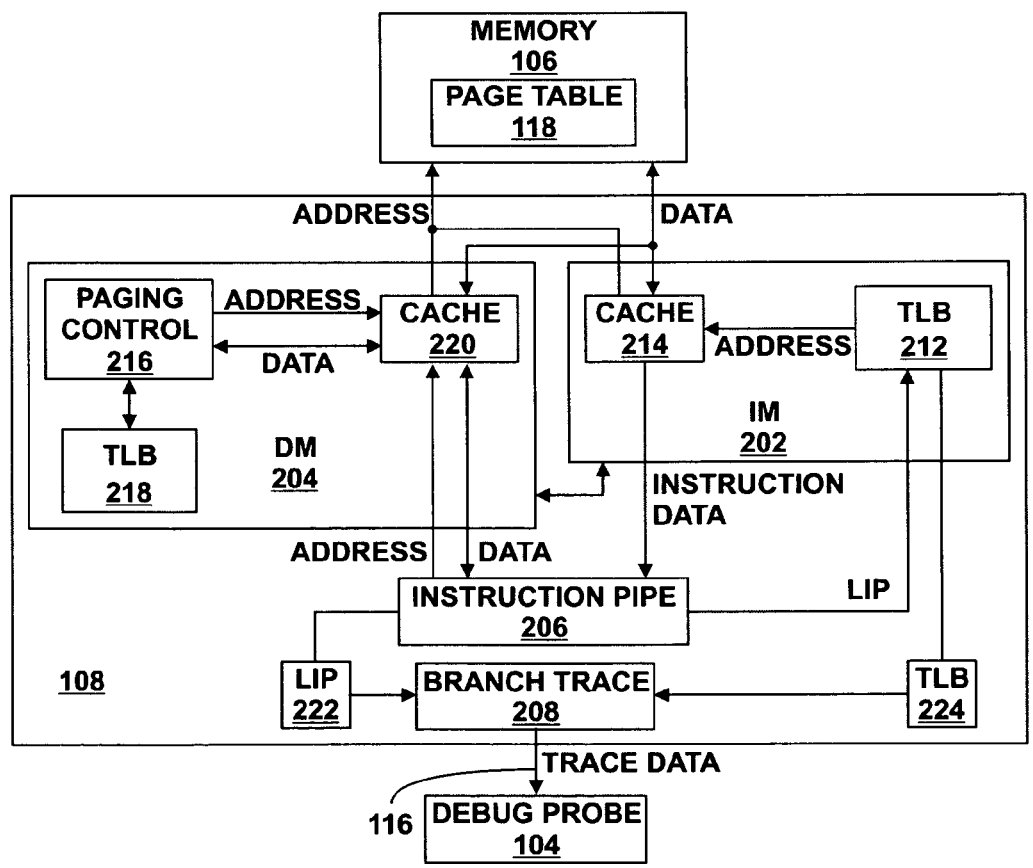
FIG. 2 is a block diagram illustrating an exemplary central processing unit of the processing system of FIG. 1 in accordance with at least one embodiment of the present disclosure.

Referring now to FIG. 2, an exemplary implementation of the CPU 108 is illustrated in accordance with at least one embodiment of the present disclosure. In the depicted example, the CPU 108 includes an instruction cache module (IM) 202, a data cache module (DM) 204, an instruction pipeline 206, and a branch trace module 208. The IM 202 includes a TLB 212 and an instruction cache 214. The DM 204 includes a paging controller 216, a TLB 218 and a cache 220. In at least one embodiment, the TLBS 212 and 218 are implemented as multilevel TLBs.

When obtaining instruction data, the instruction pipeline 206 typically provides the current LIP to the IM 202. The IM 202, however, accesses instruction data based on a physical address. Accordingly, the IM 202 utilizes the linear-to-physical address translations stored in the page table 118 to convert an LIP provided by the instruction pipeline 206 to its corresponding physical address. However, due to its size, the page table 118 typically is stored in system memory 106 and access to the page table 118 accordingly is relatively slow. To facilitate faster translations, the IM 202 utilizes its TLB 212 to store the most recent translations accessed from the page table 118 so that should a recent translation be needed again, the IM 202 would only have to access the local TLB 212 rather than requiring a load operation from system memory 206. Accordingly, as the instruction pipeline 206 executes instructions, new linear-to-physical translation entries may be added to the TLB 212. Moreover, because the TLB 212 typically is of a fixed maximum number of entries, translation entries may be evicted from the TLB 212 so that new or updated translation entries may be added. The entry and eviction of translation entries in the TLB 106 may be managed by, for example, the paging controller 216.

The instruction pipeline 206 retrieves and executes instructions and may include, for example, a prefetch unit, an instruction decode unit, an address calculation unit, an execution unit and the like. During the execution of instructions while in a paging mode, the instruction pipeline 104 obtains instruction data from the IM 202, whereby the IM 202 obtains the instruction data from the cache 214 if available, or alternately, from the cache 220 or from system memory 106 via the DM 204. The instruction pipeline 206 similarly obtains data for use during execution, and provides the resulting data, via the DM 204, whereby the data may be obtained from the cache 220 or, alternatively, from the system memory 106.

When set to a trace mode operation, the instruction pipeline 204 provides the LIP 222 (or a representation thereof) of an instruction to the branch trace module 208 prior to, during, or after the instruction's execution. To illustrate, the LIP 222 may be provided from a prefetch unit (not shown) of the instruction pipeline 206 prior to decoding and executing the instruction. Alternately, the LIP 222 may be provided by the execution unit (not shown) of the instruction pipeline 206 during or after execution of the instruction. An LIP 222 may be provided for each instruction executed by the instruction pipeline 206 or an LIP 222 may be provided for only a subset of executed instructions. For example, an LIP 222 may be provided only for branch instructions that could result in a change in the sequential flow of the instruction stream. The branch trace module 208, in response, outputs the one or more LIPs 222 as the trace instruction stream 116 (FIG. 1) for provision to the debug probe 104 via, for example, the MCP 112 (FIG. 1).

Moreover, in at least one embodiment, the status of the TLB 212 is monitored to determine when new translation entries are added to the TLB 212 and/or when translation entries are evicted from the TLB 106. In one embodiment, IM 212 monitors the TLB 212 for modifications using, for example, control logic associated with the TLB 212. In another embodiment, the branch trace module 208 monitors the status of the TLB 106 directly or via signaling provided by, for example, the paging controller 216. As described in greater detail with reference to FIGS. 3 and 4, the branch trace module 208 may provide a representation of new TLB translation entries added to the TLB 212 and/or TLB translation entries evicted from the TLB 212.

The branch trace module 208 can temporarily buffer the LIP data provided by the instruction pipeline 206 and the TLB added/evicted translation entry data obtained from the TLB 212 and then provide the LIP data and the TLB translation entry data as the trace information stream 116 for output on one or peripheral devices. For example, the trace information stream 116 may be provided for storage in the system memory 106 other storage device, or the trace information stream 116 may be provided to the debug probe 104 for reconstruction of the executed instruction history of the processing device 102. Moreover, in one embodiment, the branch trace module 208 may implement filtering to filter the LIP data and/or the TLB added/evicted translation entry data before providing it as part of trace information stream 116.

In one embodiment, the trace information stream 116 is implemented as a packet-based information transmitted over the diagnostic bus 111, where each fixed-length packet may contain one or more variable-length records. In this instance, the prefetch module of the instruction pipeline 204 may write up to one packet (comprising, for example, 64 bits) per cycle. While in trace mode, the trace information stream 116 may be implemented using four or more types of records, such as a short record, a null record, a synchronization record, and a translation record. Each of these record types is discussed herein in turn.

The instruction stream executed by the instruction pipeline 206 may be divided into segments that include a series of zero or more sequential (non-change of flow or non-COF) instructions followed by either a COF instruction (e.g., jumps, conditional branches, calls, returns and interrupt instructions) or an exception. COF instructions are instructions that represent a potential change in the sequence of instructions. In such instances, short records can be used to describe segments of zero or more non-COF instructions followed by a COF instruction or an exception. Typically, the majority of the instruction segments are described by short records. In one embodiment, short records are one byte long and have the exemplary format described in Table 1 below.

TABLE 1

Short Record

| BIT | NAME | DESCRIPTION | |
|---|---|---|---|
| 7:3 | COUNT | Number of Sequential (non-COF) instructions in the segment (0-31) | |
| 2:0 | TYPE | Type of Record | |
| | | 000 | Not a short record |
| | | 001 | Segment ended with a non-COF instruction |
| | | 010 | Segment ended with a taken COF instruction |
| | | 111 | Segment ended with a non-taken COF instruction |
| | | 101 | Segment ended with an exception |

Synchronization records, in one embodiment, are transmitted after each inter-segment COF instruction or exception (such as a debug stall), serializing instruction, return or indirect COF instruction. To assist debug components in decoding long streams of records that do not contain inter-segment jumps, exceptions or serializing instructions, synchronization records also can be sent periodically. In one embodiment, synchronization records are five bytes long and have the exemplary format described in Table 2.

TABLE 2

Synchronization Record

| BIT | NAME | DESCRIPTION | |
|---|---|---|---|
| 39:8 | LIP | Linear address of the next instruction to be executed | |
| 7 | INVLTLB | TLB was invalidated | |
| 6 | CSIZE | Next instruction to be executed will be in 32-bit code segment | |
| 5 | DMM | Next instruction to be executed will be in debug management mode | |
| 4 | SMM | Next instruction to be executed will be in system management mode | |
| 3 | PAGING | Paging will be enabled for the next instruction executed | |
| 2:0 | TYPE | Type of Record | |
| | | 0xx | Not a synchronization record |
| | | x0x | Not a synchronization record |
| | | 110 | Synchronization record |
| | | xx1 | Not a synchronization record |

As noted above, modifications to the TLB 212 of the IM 202, such as the addition of a new TLB entry or the eviction of an old TLB entry, can trigger the provision of a representation of the evicted or added translation entry as part of the translation information stream 116. In one embodiment, the linear-to-physical address translation entries described herein may be represented by translation records that are six bytes long and have the exemplary format described in Table 3 below.

TABLE 3

Translation Record

| BIT | NAME | DESCRIPTION | |
|---|---|---|---|
| 47:28 | PHYSICAL | Most significant 20 bits of a physical address | |
| 27:00 | LINEAR | Most significant 20 bits of a linear address | |
| 6:4 | Reason | Reason translation was included in trace (e.g., evicted or added) | |
| 2:0 | TYPE | Type of Record | |
| | | 0xx | Not a translation record |
| | | x1x | Not a translation record |
| | | xx1 | Not a translation record |
| | | 100 | Translation record |

When in trace or debug mode, a packet is sent via the diagnostic bus 111 whenever a packet is filled with records. However, when the CPU 108 enters a suspend, stall or halt state, the prefetch module may not have enough data to fill another packet. In such instances, the remainder of the packet is filled with null records, which are one byte long and are represented as, for example, a string of zeros.

Figure 3:
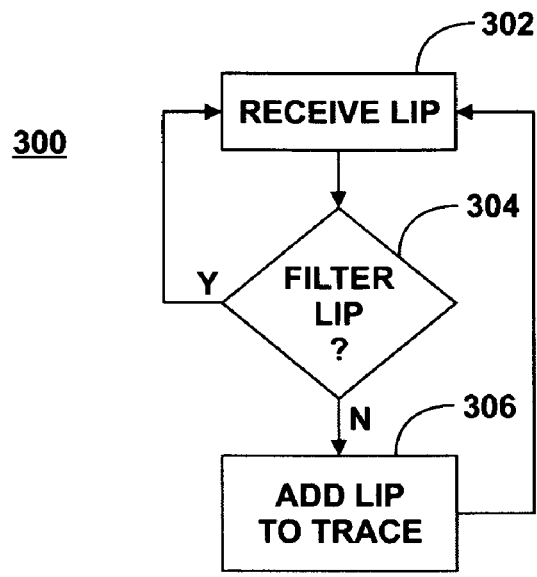
FIGS. 3 and 4 are flow diagrams illustrating exemplary methods for generating a trace stream in accordance with at least one embodiment of the present disclosure.
Figure 4:
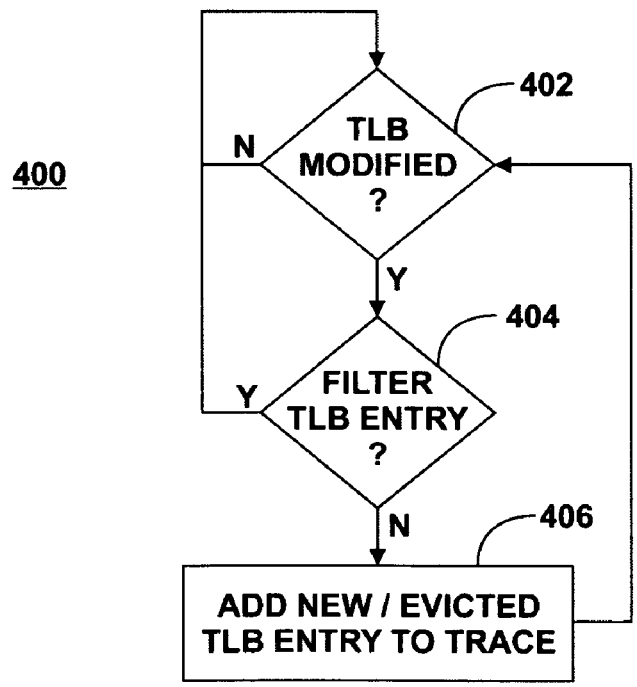

Referring now to FIGS. 3 and 4, exemplary methods for providing a trace information stream are illustrated in accordance with at least one embodiment of the present disclosure. In at least one embodiment, the processing system 100 of FIG. 1 implements the techniques described in FIGS. 3 and 4 independently and typically in parallel.

The method 300 of FIG. 3 initiates at step 302 whereupon the instruction pipeline 206 executes (or prepares to execute) an instruction and accordingly provides a representation of the LIP 222 of the instruction to the branch trace module 208. In at least one embodiment, the branch trace module 208 may filter the LIPs 222 at step 304 so that only the LIPs 222 associated with certain instructions are output as part of the trace information stream 116. For example, it will be appreciated that instructions typically are executed sequentially unless a branch instruction is encountered and the executed instruction stream may be sufficiently represented by the LIPs 222 of branch instructions and their target instructions. In the event that the LIP 222 does not meet the filtering constraints, the method 300 returns to step 302 for the next LIP 222. Otherwise, if the filtering constraints are met or if no filtering is implemented, at step 306 the branch trace module 208 provides a representation of the LIP 222 as part of the trace information stream 116 using, for example, the packet-based stream format with records as described above. Steps 302 and 306 may be repeated for subsequent executed instructions.

The method 400 of FIG. 4 initiates at step 402 whereupon a modification to the TLB 212 is detected by, for example, the IM 202. The modification can result from the addition of a new translation entry to the TLB 212, or, alternatively, from the eviction of a translation entry from the TLB 212. In at least one embodiment, the branch trace module 208 may filter the TLB translation entries at step 404 so that only certain TLB translation entries (e.g., those TLB translation entries associated with only certain linear address ranges or physical address ranges) are added to the trace information stream 116. If the added/evicted TLB translation entry does not meet the filtering constraints, the added/evicted TLB translation entry is not added to the trace stream 116 and the method 400 returns to step 402. Otherwise, if the filtering constraints are met or if no filtering is involved, the branch trace module 208 adds a representation of the new TLB translation entry to the trace information stream 116 at step 406 using, for example, a translation record of the packet-based stream format described above. Steps 402-408 may be repeated for subsequent executed instructions.

Figure 5:
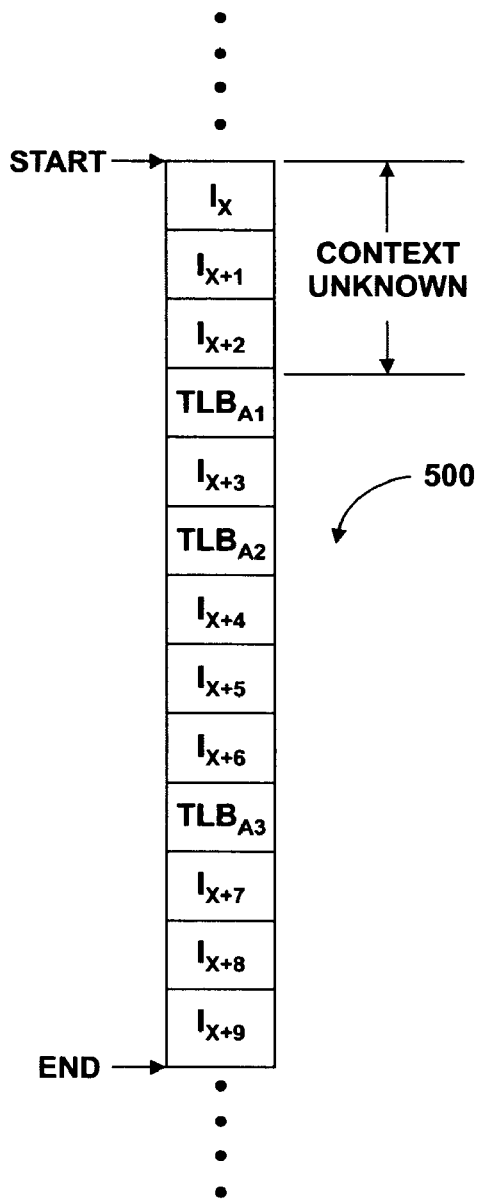
FIGS. 5 and 6 are block diagrams illustrating exemplary trace streams generated using the exemplary methods of FIGS. 3 and 4 in accordance with at least one embodiment of the present disclosure.
Figure 6:
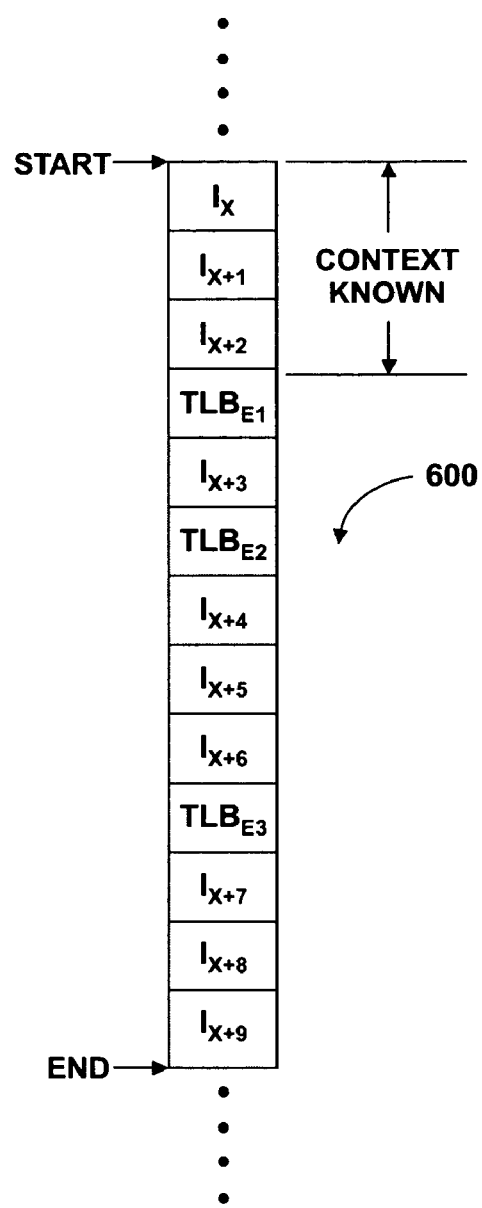

Referring now to FIGS. 5 and 6, exemplary trace information streams 500 and 600 are illustrated. The trace information stream 500 represents an exemplary trace stream generated based on the exemplary method 300 of FIG. 3. In the depicted example, instruction pointers $I_x$-$I_{x+2}$ are added to the trace information stream 500 before the TLB translation entry $TLB_{A1}$ was added to the TLB 212 and therefore also added to the trace information stream 500. The TLB translation entry $TLB_{A1}$ is followed by instruction pointer $I_{x+3}$ before the TLB translation entry $TLB_{A2}$ was added to the TLB 106 and therefore also added to the trace information stream 500. Likewise, instruction pointers $I_{x+4}$-$I_{x+6}$ are added to the stream 500 prior to the addition of TLB translation entry $TLB_{A3}$ and instruction pointers $I_{x+7}$-$I_{x+9}$ are added subsequent to the addition of the TLB translation entry $TLB_{A3}$. The trace information stream 600 of FIG. 6 is generated in a similar manner where TLB translation entries $TLB_{E1}$, $TLB_{E2}$ and $TLB_{E3}$ are interposed between instruction pointers $I_x$-$I_{x+9}$. However, unlike the stream 500, the TLB translation entries $TLB_{E1}$, $TLB_{E2}$ and $TLB_{E3}$ represent the TLB translation entries evicted from the TLB 212 at their respective times.

In certain instances, the trace information stream 600 allows for a more complete reconstruction of a longer executed instruction history than the trace information stream 500. To illustrate, assuming that the current state of the TLB 212 and the page table 118 is known or can be determined at the end of the trace streams 500 and 600, it will be appreciated that the instructions corresponding to instruction pointers $I_x$-$I_{x+2}$ may be indeterminable because they occur before the first added TLB translation entry ($TLB_{A1}$) represented in the stream 500 and, therefore, the proper linear-to-physical mapping for these instruction pointers may not be available. However, as the first TLB translation entry ($TLB_{E1}$) of the stream 600 represents the TLB translation entry evicted from the TLB 212, the proper linear-to-physical mapping for the instruction pointers $I_x$-$I_{x+2}$ may be determined from the trace information stream 600 and the current context at the end of the trace stream 600. Conversely, when the processor silicon enters an unrecoverable state and cannot be easily probed, the TLB entry information leading up to the failure is available in the trace information stream 500 thereby allowing at least a partial construction of the events leading up to the catastrophic processor behaviour.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
    providing a first set of linear address representations for storage in a buffer of a processing device in response to executing a first set of instructions during a first execution period, each of the linear address representations corresponding to an instruction of the first set of instructions;
    providing a second set of linear address representations for storage in the buffer in response to executing a second set of instructions during a second execution period subsequent to the first execution period, each of the linear address representations corresponding to an instruction of the second set of instructions;
    providing address translation information for storage in the buffer after the first set of linear address representations and before the second set of linear address representations, the address translation information representing a change in a linear address-to-physical address mapping of a translation look aside buffer (TLB) between the first execution period and the second execution period; and
    providing a trace information stream for output from the buffer of the processing device to a debug component external to the processing device, the trace information stream comprising the first set of linear address representations, the address translation information, and the second set of linear address representations.

2. The method of claim 1, wherein the address translation information is provided in response to a modification of the TLB.

3. The method of claim 2, wherein the modification of the TLB comprises an addition of a first translation entry to the TLB and wherein the address translation information comprises a representation of the first translation entry.

4. The method of claim 2, wherein the modification of the TLB comprises an eviction of a first translation entry from the TLB and wherein the address translation information comprises a representation of the first translation entry.

5. The method of claim 1, further comprising reconstructing an executed instruction history for the first and second time periods based on the first and second sets of linear address information and the address translation information.

6. A method comprising:
    executing, at a processing device, a first instruction at a first time;
    outputting from the processing device via a debug interface of the processing device a first linear address information associated with the first instruction at a second time;
    modifying a first entry of a translation lookaside buffer (TLB) of the processing device at a third time subsequent to the first time;
    outputting from the processing device via the debug interface a first address translation information associated with the modification of the first entry of the TLB at a fourth time subsequent to the third time;
    executing, at the processing device, a second instruction at a fifth time subsequent to the third time; and outputting from the processing device via the debug interface a second linear address information associated with the second instruction at a sixth time subsequent to the fifth time.

7. The method of claim 6, further comprising:

executing, at the processing device, a third instruction at a seventh time subsequent to the fifth time;

outputting from the processing device a third linear address information associated with the third instruction at an eighth time subsequent to the seventh time;

modifying a second entry of the TLB at a ninth time subsequent to the seventh time; and outputting from the processing device a second address translation information associated with the modification of the second entry of the TLB at a tenth time subsequent to the ninth time.

8. The method of claim 6, further comprising:

outputting the first linear address information, the first address information, and the second linear address information from the processing device as part of a trace information stream.

9. The method of claim 8, further comprising:

reconstructing an executed instruction history based on the trace information stream.

10. The method of claim 6, wherein:

the first linear address information comprises a representation of a first instruction pointer associated with the first instruction;

the second linear address information comprises a representation of a second instruction pointer associated with the second instruction.

11. The method of claim 6, wherein:

modifying the first translation entry of the TLB comprises adding the first translation entry to the TLB; and wherein the first address translation information comprises a representation of the first translation entry.

12. The method of claim 6, wherein:

modifying the first translation entry of the TLB comprises evicting the first translation entry from the TLB; and wherein the first address translation information comprises a representation of the first translation entry.

13. A system comprising:

a processing device comprising:

an instruction pipeline configured to, for each instruction of a set of instructions, provide a linear address information associated with the instruction in response to executing the instruction;

a translation lookaside buffer (TLB) configured to provide an address translation information in response to a modification of the TLB during execution of the set of instructions, the address translation information representative of the modification of the TLB; and a trace module configured to generate a trace information stream for output from the processing device, the trace information stream including the linear address information and the address translation information.

14. The system of claim 13, further comprising:

a debug module coupled to the processing device, the debug module configured to receive the trace information stream and to reconstruct an executed instruction history based on the trace information stream.

15. The system of claim 13, wherein the linear address information associated with an instruction of the series of instructions comprises a representation of an instruction pointer associated with the instruction.

16. The system of claim 13, wherein:

the modification of the TLB comprises an addition of a translation entry to the TLB; and the address translation entry comprises a representation of the translation entry.

17. The system of claim 13, wherein:

the modification of the TLB comprises an eviction of a translation entry from the TLB; and the address translation entry comprises a representation of the translation entry.

18. The system of claim 13, wherein:

the linear address information associated with an instruction comprises a representation of an instruction pointer associated with the instruction;

the address translation information associated with the modification of the TLB comprises a representation of a modified translation entry of the TLB; and the trace information stream comprises a sequence of values, the sequence of values comprising a sequence of representations of instruction pointers and the representation of the modified translation entry.

19. The system of claim 13, wherein a position of the representation of the modified translation entry in the sequence of values relative to the representations of instruction pointers corresponds to an occurrence of the modification of the TLB relative to the execution of instructions of the set of instructions.

* * * * *